(12) United States Patent
Shepelev

(10) Patent No.: US 10,592,022 B2
(45) Date of Patent: Mar. 17, 2020

(54) DISPLAY DEVICE WITH AN INTEGRATED SENSING DEVICE HAVING MULTIPLE GATE DRIVER CIRCUITS

(71) Applicant: SYNAPTICS INCORPORATED, San Jose, CA (US)

(72) Inventor: Petr Shepelev, Campbell, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 138 days.

(21) Appl. No.: 14/983,230

(22) Filed: Dec. 29, 2015

(65) Prior Publication Data

US 2017/0185198 A1 Jun. 29, 2017

(51) Int. Cl.
G09G 1/00 (2006.01)
G06F 3/041 (2006.01)
G06F 3/044 (2006.01)
G09G 3/20 (2006.01)

(52) U.S. Cl.
CPC ............ *G06F 3/0412* (2013.01); *G06F 3/044* (2013.01); *G06F 3/0416* (2013.01); *G09G 3/20* (2013.01)

(58) Field of Classification Search
CPC .............................. G06F 3/0416; G06F 3/041
See application file for complete search history.

(56) References Cited

U.S. PATENT DOCUMENTS

| 5,093,655 A | 3/1992 | Tanioka et al. |
| 5,392,058 A | 2/1995 | Tagawa |
| 5,534,892 A | 7/1996 | Tagawa |
| 5,896,120 A | 4/1999 | Iguchi et al. |
| 6,219,113 B1 | 4/2001 | Takahara |
| 6,239,788 B1 | 5/2001 | Nohno et al. |
| 6,560,276 B1 | 5/2003 | Long et al. |
| 7,031,886 B1 | 4/2006 | Hargreaves |
| 7,173,676 B2 | 2/2007 | Jeon et al. |
| 7,451,050 B2 | 11/2008 | Hargreaves |
| 7,633,566 B2 | 12/2009 | Utsunomiya et al. |

(Continued)

FOREIGN PATENT DOCUMENTS

| CN | 1940842 A | 4/2007 |
| CN | 101051256 A | 10/2007 |

(Continued)

OTHER PUBLICATIONS

International Search Report and Written Opinion dated May 29, 2014 for Application No. PCT/US2014/016577.

(Continued)

*Primary Examiner* — Michael A Faragalla
(74) *Attorney, Agent, or Firm* — Patterson + Sheridan, LLP

(57) ABSTRACT

Embodiments described herein include a method, processing system, and input device having a display device with an integrated sensing device. The method comprises selecting, using first gate driver circuitry, a first subset of a first plurality of gate electrodes of the display device for performing display updating during a first period. The method further comprises selecting, using second gate driver circuitry, a first subset of a second plurality of gate electrodes of the display device for display updating during a second period. The method further comprises operating, during a third period between the first and second periods, at least a first sensor electrode of a plurality of sensor electrodes for capacitive sensing.

21 Claims, 6 Drawing Sheets

(56) References Cited

U.S. PATENT DOCUMENTS

| | | |
|---|---|---|
| 8,537,126 B2 | 9/2013 | Yousefpor et al. |
| 9,182,847 B2 | 11/2015 | Lee et al. |
| 2004/0095336 A1 | 5/2004 | Hong et al. |
| 2004/0217945 A1 | 11/2004 | Miyamoto et al. |
| 2005/0135492 A1 | 6/2005 | Jia et al. |
| 2006/0012575 A1 | 1/2006 | Knapp et al. |
| 2006/0114247 A1 | 6/2006 | Brown |
| 2006/0214918 A1 | 9/2006 | Destura et al. |
| 2006/0236029 A1 | 10/2006 | Corrado et al. |
| 2007/0026966 A1 | 2/2007 | Sanchez |
| 2007/0074914 A1 | 4/2007 | Geaghan et al. |
| 2007/0262966 A1 | 11/2007 | Nishimura et al. |
| 2008/0002130 A1 | 1/2008 | Kil |
| 2008/0018581 A1 | 1/2008 | Park et al. |
| 2008/0048989 A1 | 2/2008 | Yoon et al. |
| 2008/0055267 A1 | 3/2008 | Wu et al. |
| 2008/0061140 A1 | 3/2008 | McMahon |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0104655 A1 | 5/2008 | Hayward |
| 2008/0144743 A1 | 6/2008 | Alderson et al. |
| 2008/0150901 A1 | 6/2008 | Lowles et al. |
| 2008/0180407 A1 | 7/2008 | Utsunomiya et al. |
| 2008/0224980 A1* | 9/2008 | Senda .................. G09G 3/3648 345/96 |
| 2008/0238867 A1 | 10/2008 | Maeda et al. |
| 2008/0309625 A1 | 12/2008 | Krah et al. |
| 2008/0309627 A1 | 12/2008 | Hotelling et al. |
| 2008/0309628 A1 | 12/2008 | Krah et al. |
| 2009/0009194 A1 | 1/2009 | Seguine |
| 2009/0046205 A1 | 2/2009 | Strasser et al. |
| 2009/0079707 A1 | 3/2009 | Kaehler et al. |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0213042 A1 | 8/2009 | Hagino et al. |
| 2009/0256818 A1 | 10/2009 | Noguchi et al. |
| 2009/0256868 A1 | 10/2009 | Low et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0053380 A1 | 3/2010 | Ise |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0225621 A1* | 9/2010 | Jung .................. G09G 3/3677 345/204 |
| 2010/0265210 A1 | 10/2010 | Nakanishi et al. |
| 2010/0289765 A1 | 11/2010 | Noguchi et al. |
| 2010/0295804 A1 | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0042152 A1 | 2/2011 | Wu |
| 2011/0050585 A1 | 3/2011 | Hotelling et al. |
| 2011/0102361 A1 | 5/2011 | Philipp |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0227889 A1 | 9/2011 | Choi |
| 2011/0267305 A1 | 11/2011 | Shahparnia et al. |
| 2011/0285683 A1 | 11/2011 | Todorovich et al. |
| 2012/0032911 A1 | 2/2012 | Jung et al. |
| 2012/0050217 A1 | 3/2012 | Noguchi et al. |
| 2012/0102191 A1 | 4/2012 | Rabii |
| 2012/0212521 A1 | 8/2012 | Yamauchi et al. |
| 2012/0218246 A1 | 8/2012 | Ueda et al. |
| 2012/0242597 A1 | 9/2012 | Hwang et al. |
| 2012/0249476 A1 | 10/2012 | Schwartz et al. |
| 2013/0021309 A1 | 1/2013 | Kothari et al. |
| 2013/0050144 A1 | 2/2013 | Reynolds |
| 2013/0057511 A1 | 3/2013 | Shepelev et al. |
| 2013/0094126 A1 | 4/2013 | Rappoport et al. |
| 2013/0342481 A1 | 12/2013 | Small et al. |
| 2014/0071066 A1* | 3/2014 | Lee .................. G06F 3/0416 345/173 |
| 2014/0184533 A1 | 7/2014 | Park et al. |
| 2014/0267217 A1 | 9/2014 | Lillie et al. |
| 2014/0320427 A1* | 10/2014 | Lee .................. G06F 3/0416 345/173 |
| 2014/0368462 A1 | 12/2014 | Shepelev |

FOREIGN PATENT DOCUMENTS

| | | |
|---|---|---|
| CN | 1940842 B | 5/2010 |
| EP | 1892605 A2 | 2/2008 |
| EP | 1936479 A1 | 6/2008 |
| EP | 1892605 A3 | 7/2008 |
| EP | 2330493 A2 | 6/2011 |
| EP | 2343631 A1 | 7/2011 |
| JP | 2006106853 A | 4/2006 |
| JP | 2007-065508 A | 3/2007 |
| JP | 2007334606 A | 12/2007 |
| JP | 2008015755 A | 1/2008 |
| JP | 2008090623 A | 4/2008 |
| JP | 2010072581 A | 4/2010 |
| TW | 200945147 A | 11/2009 |
| WO | WO-0127868 A1 | 4/2001 |
| WO | WO-03019346 A1 | 3/2003 |
| WO | WO-2004045905 A2 | 6/2004 |
| WO | WO-2004046905 A3 | 8/2004 |
| WO | WO-2006054585 A1 | 5/2006 |
| WO | WO-2007003108 A1 | 1/2007 |
| WO | WO-2007012256 A1 | 2/2007 |
| WO | WO-2007102238 A1 | 9/2007 |
| WO | WO-2008050507 A1 | 5/2008 |
| WO | WO-2010009655 A1 | 1/2010 |
| WO | WO-2010137727 A1 | 12/2010 |

OTHER PUBLICATIONS

Japanese Patent Application No. P2014-529868, Office Action dated Nov. 24, 2015, 9 pages.
European Patent Office, Supplementary European Search Report, Application No. 12829359.4-1507 / 2754017, PCT/US2012054005, pp. 1-9, dated Jun. 2, 2015.
International Search Report and Written Opinion for Application No. PCT/US2014/039235, dated Sep. 19, 2014, 10 pages.
PCT international search report and written opinion of PCT/US2012/054005 dated Jan. 3, 2013.

\* cited by examiner

DISPLAY DEVICE WITH AN INTEGRATED SENSING DEVICE HAVING MULTIPLE GATE DRIVER CIRCUITS

BACKGROUND

Field of the Disclosure

Embodiments of the present disclosure generally relate to techniques for operating an input device having a display device with an integrated sensing device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment described herein is an input device having a display device with an integrated sensing device. The input device comprises a plurality of sensor electrodes, and a processing system coupled with the plurality of sensor electrodes and configured to select, using first gate driver circuitry, a first subset of a first plurality of gate electrodes of the display device for performing display updating during a first period. The processing system is further configured to select, using second gate driver circuitry, a first subset of a second plurality of gate electrodes of the display device for display updating during a second period, and operate, during a third period between the first and second periods, at least a first sensor electrode of the plurality of sensor electrodes for capacitive sensing.

Another embodiment described herein is a processing system for a display device with an integrated sensing device. The processing system comprises first gate driver circuitry configured to select, during a first period, a first subset of a first plurality of gate electrodes of the display device for display updating. The processing system further comprises second gate driver circuitry configured to select, during a second period, a first subset of a second plurality of gate electrodes of the display device for display updating. The processing system further comprises sensing circuitry coupled with a plurality of sensor electrodesand configured to operate, during a third period between the first and second periods, at least a first sensor electrode of the plurality of sensor electrodes for capacitive sensing.

Another embodiment described herein is a method of operating an input device having a display device with an integrated sensing device. The method comprises selecting, using first gate driver circuitry, a first subset of a first plurality of gate electrodes of the display device for performing display updating during a first period. The method further comprises selecting, using second gate driver circuitry, a first subset of a second plurality of gate electrodes of the display device for display updating during a second period. The method further comprises operating, during a third period between the first and second periods, at least a first sensor electrode of a plurality of sensor electrodes for capacitive sensing.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
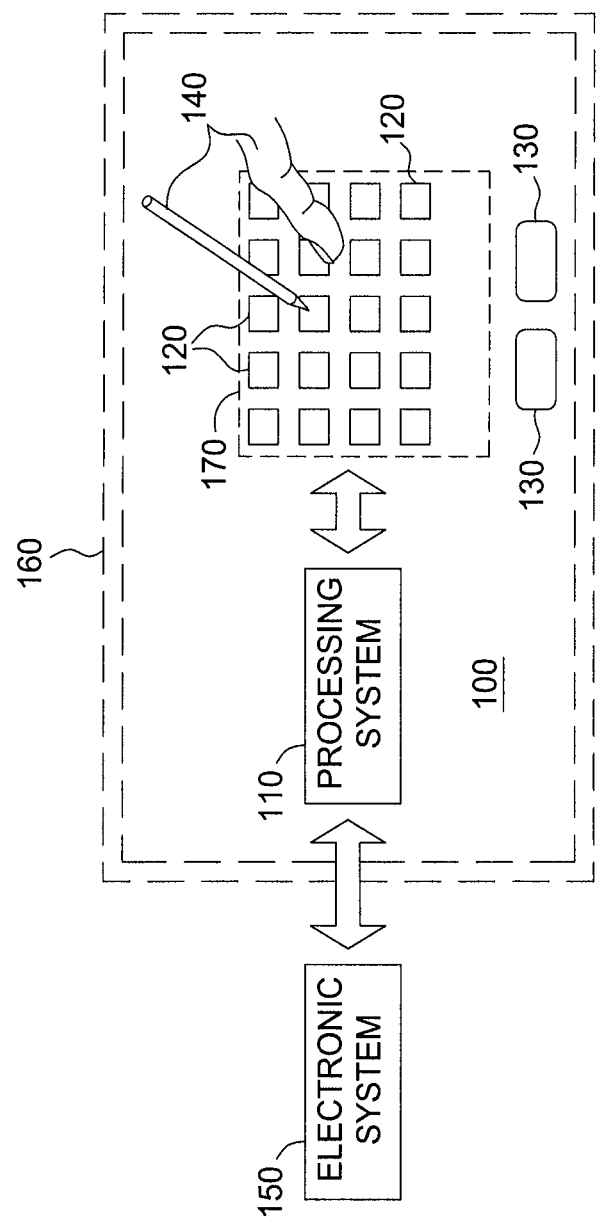
FIG. 1 is a schematic block diagram of an input device, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or the application and uses of the disclosure. Furthermore, there is no intention to be bound by any expressed or implied theory presented in the preceding background, summary, or the following detailed description.

Various embodiments of the present technology provide input devices and methods for improving usability. An input device may include electrodes that are operated as sensor electrodes to detect interaction between the input device and an input object (e.g., a stylus or a user's finger). However, performing capacitive sensing of input devices within the timing used for updating a particular display frame (such as during a long horizontal blanking period within the display frame) can require pausing or interrupting a partially-completed display update cycle. For certain display implementations, the interruptions can cause display artifacts or other undesirable display performance.

According to various embodiments described herein, capacitive sensing performance may be improved using a processing system having multiple, independent gate driver circuits configured to update respective display regions within each display frame. Each of the multiple gate driver circuits can begin and complete the display update routine for its respective display region(s) without interruption, and capacitive sensing may be performed during non-display update periods between display updates for different gate driver circuits.

FIG. 1 is a schematic block diagram of an input device 100, in accordance with embodiments of the present technology. In various embodiments, input device 100 comprises a display device integrated with a sensing device. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensor electrodes 120 for detecting user input. The input device 100 may include one or more sensor electrodes 120 that are combined to form sensor electrodes. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensor electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensor electrodes 120 to create electric fields. In some capacitive implementations, separate sensor electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In one embodiment, processing system 110 is configured to drive a voltage with known amplitude onto the sensor electrode 120 and measure the amount of charge required to charge the sensor electrode to the driven voltage. In other embodiments, processing system 110 is configured to drive a known current and measure the resulting voltage. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensing electrodes. In various embodiments, an input object 140 near the sensing electrodes alters the electric field between the sensing electrodes, thus changing the measured capacitive coupling. In one implementation, a transcapacitive sensing method operates by detecting the capacitive coupling between one or more transmitter sensing electrodes (also "transmitter electrodes") and one or more receiver sensing electrodes (also "receiver electrodes") as further described below. Transmitter sensing electrodes may be modulated relative to a reference voltage (e.g., system ground) to transmit a transmitter signals. Receiver sensing electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensing electrodes may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensor electrode(s) 120 of the input device 100. In other embodiments, components of processing system 110 are physically separate with one or more components close to sensor electrode(s) 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensor electrodes 120 to detect input, identification modules configured to identify gestures such as mode changing gestures, and mode changing modules for changing operation modes. Processing system 110 may also comprise one or more controllers.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensor electrode(s) 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensor electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensor electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Sensor Electrode Arrangements

Figure 2:
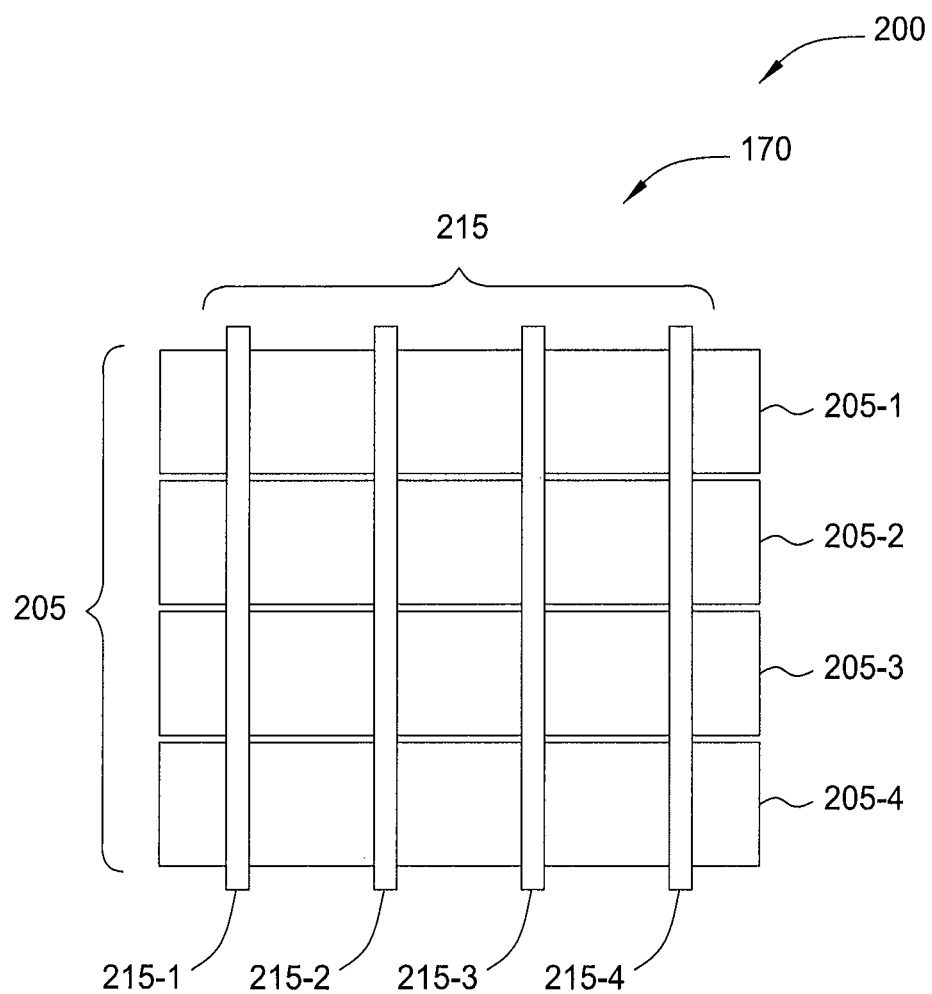
FIGS. 2 and 3 illustrate portions of exemplary sensor electrode arrangements, according to embodiments described herein.
Figure 3:
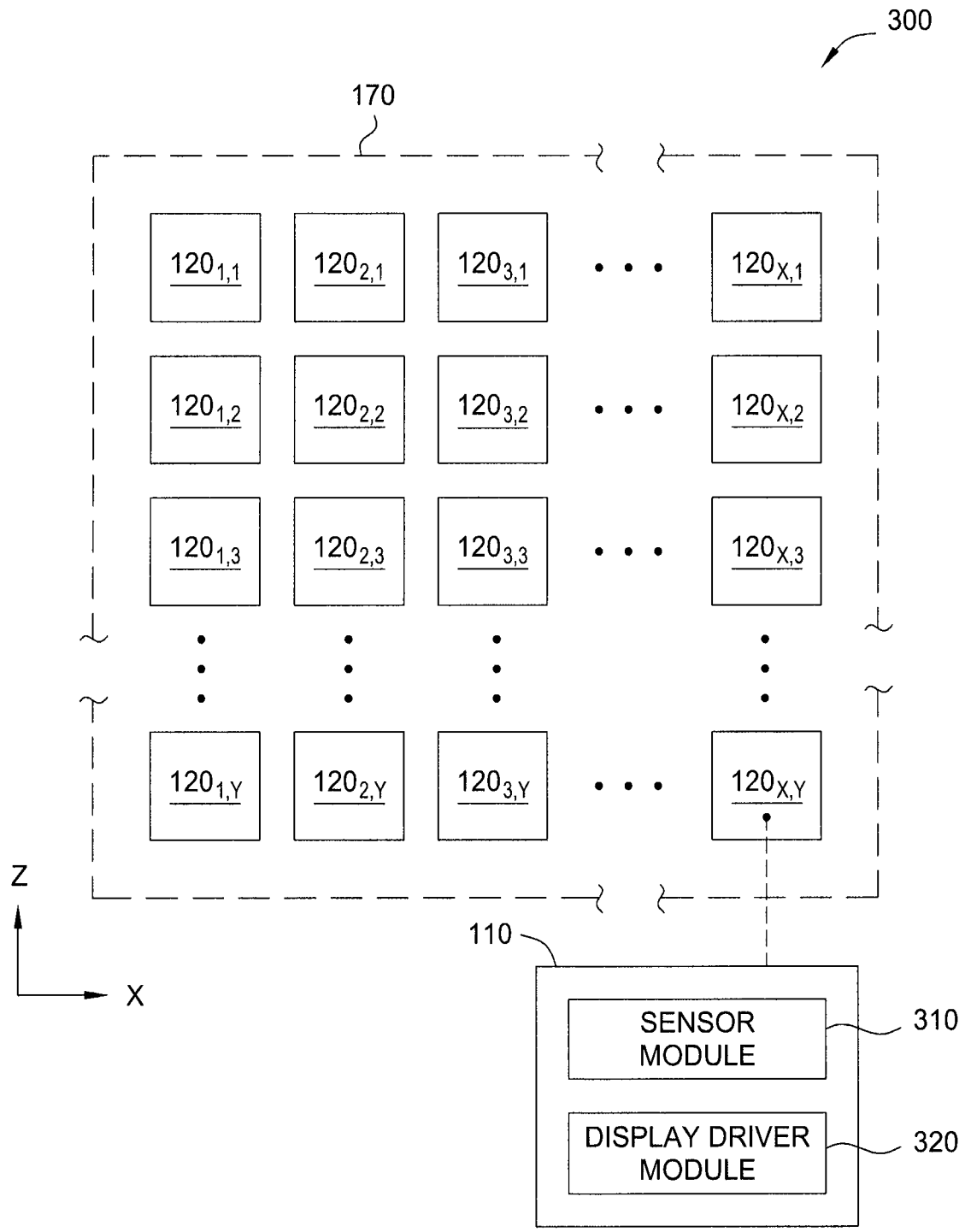

FIGS. 2 and 3 illustrate portions of exemplary sensor electrode arrangements, according to embodiments described herein. Specifically, arrangement 200 (FIG. 2) illustrates a portion of a pattern of sensor electrodes configured to sense in a sensing region 170 associated with the pattern, according to several embodiments. For clarity of illustration and description, FIG. 2 shows the sensor electrodes in a pattern of simple rectangles, and does not show various associated components. This pattern of sensing electrodes comprises a first plurality of sensor electrodes 205 (e.g., 205-1, 205-2, 205-3, 205-4), and a second plurality of sensor electrodes 215 (e.g., 215-1, 215-2, 215-3, 215-4). The sensor electrodes 205, 215 are each examples of the sensor electrodes 120 discussed above. In one embodiment, processing system 110 operates the first plurality of sensor electrodes 205 as a plurality of transmitter electrodes, and the second plurality of sensor electrodes 215 as a plurality of receiver electrodes. In another embodiment, processing system 110 operates the first plurality of sensor electrodes 205 and the second plurality of sensor electrodes 215 as absolute capacitive sensing electrodes.

The first plurality of sensor electrodes 205 and the second plurality of sensor electrodes 215 are typically ohmically isolated from each other. That is, one or more insulators separate the first plurality of sensor electrodes 205 and the second plurality of sensor electrodes 215 and prevent them from electrically shorting to each other. In some embodiments, the first plurality of sensor electrodes 205 and the second plurality of sensor electrodes 215 may be disposed on a common layer. The pluralities of sensor electrodes 205, 215 may be electrically separated by insulative material disposed between them at cross-over areas; in such constructions, the first plurality of sensor electrodes 205 and/or the second plurality of sensor electrodes 215 may be formed with jumpers connecting different portions of the same electrode. In some embodiments, the first plurality of sensor electrodes 205 and the second plurality of sensor electrodes 215 are separated by one or more layers of insulative material. In some embodiments, the first plurality of sensor electrodes 205 and the second plurality of sensor electrodes 215 are separated by one or more substrates; for example, they may be disposed on opposite sides of the same substrate, or on different substrates that are laminated together.

The pluralities of sensor electrodes 205, 215 may be formed into any desired shapes. Moreover, the size and/or shape of the sensor electrodes 205 may be different than the size and/or shape of the sensor electrodes 215. Additionally, sensor electrodes 205, 215 located on a same side of a substrate may have different shapes and/or sizes. In one embodiment, the first plurality of sensor electrodes 205 may be larger (e.g., having a larger surface area) than the second plurality of sensor electrodes 215, although this is not a requirement. In other embodiments, the first and second pluralities of sensor electrodes 205, 215 may have a similar size and/or shape.

In one embodiment, the first plurality of sensor electrodes 205 extends substantially in a first direction while the second plurality of sensor electrodes 215 extends substantially in a second direction. For example, and as shown in FIG. 2, the first plurality of sensor electrodes 205 extend in one direction, while the second plurality of sensor electrodes 215 extend in a direction substantially orthogonal to the sensor electrodes 205. Other orientations are also possible (e.g., parallel or other relative orientations).

In some embodiments, both the first and second pluralities of sensor electrodes 205, 215 are located outside of a plurality (or display stack) of layers that together form the display device 160. One example of a display stack may include layers such as a lens layer, a one or more polarizer layers, a color filter layer, one or more display electrodes layers, a display material layer, a thin-film transistor (TFT) glass layer, and a backlight layer. However, other arrangements of a display stack are possible. In other embodiments, one or both of the first and second pluralities of sensor electrodes 205, 215 are located within the display stack, whether included as part of a display-related layer or a separate layer. For example, Vcom electrodes within a particular display electrode layer can be configured to perform both display updating and capacitive sensing.

Arrangement 300 of FIG. 3 illustrates a portion of a pattern of sensor electrodes configured to sense in sensing region 170, according to several embodiments. For clarity of illustration and description, FIG. 3 shows the sensor electrodes 120 in a pattern of simple rectangles and does not show other associated components. The exemplary pattern comprises an array of sensor electrodes $120_{X,Y}$ arranged in X columns and Y rows, wherein X and Y are positive integers, although one of X and Y may be zero. It is contemplated that the pattern of sensor electrodes 120 may have other configurations, such as polar arrays, repeating patterns, non-repeating patterns, a single row or column, or other suitable arrangement. Further, in various embodiments the number of sensor electrodes 120 may vary from row to row and/or column to column. In one embodiment, at least one row and/or column of sensor electrodes 120 is offset from the others, such it extends further in at least one direction than the others. The sensor electrodes 120 is coupled to the processing system 110 and utilized to determine the presence (or lack thereof) of an input object in the sensing region 170.

In a first mode of operation, the arrangement of sensor electrodes 120 ($120_{1,1}$, $120_{2,1}$, $120_{3,1}$, $120_{X,Y}$) may be utilized to detect the presence of an input object via absolute sensing techniques. That is, processing system 110 is configured to modulate sensor electrodes 120 to acquire measurements of changes in capacitive coupling between the modulated sensor electrodes 120 and an input object to determine the position of the input object. Processing system 110 is further configured to determine changes of absolute capacitance based on a measurement of resulting signals received with sensor electrodes 120 which are modulated.

In some embodiments, the arrangement 300 includes one or more grid electrodes (not shown) that are disposed between at least two of the sensor electrodes 120. The grid electrode(s) may at least partially circumscribe the plurality of sensor electrodes 120 as a group, and may also, or in the alternative, completely or partially circumscribe one or more of the sensor electrodes 120. In one embodiment, the grid electrode is a planar body having a plurality of apertures, where each aperture circumscribes a respective one of the sensor electrodes 120. In other embodiments, the grid electrode(s) comprise a plurality of segments that may be driven individually or in groups or two or more segments. The grid electrode(s) may be fabricated similar to the sensor electrodes 120. The grid electrode(s), along with sensor electrodes 120, may be coupled to the processing system 110 utilizing conductive routing traces and used for input object detection.

The sensor electrodes 120 are typically ohmically isolated from each other, and are also ohmically isolated from the grid electrode(s). That is, one or more insulators separate the sensor electrodes 120 and grid electrode(s) and prevent them from electrically shorting to each other. In some embodiments, the sensor electrodes 120 and grid electrode(s) are separated by an insulative gap, which may be filled with an electrically insulating material, or may be an air gap. In some embodiments, the sensor electrodes 120 and the grid electrode(s) are vertically separated by one or more layers of insulative material. In some other embodiments, the sensor electrodes 120 and the grid electrode(s) are separated by one or more substrates; for example, they may be disposed on opposite sides of the same substrate, or on different substrates. In yet other embodiments, the grid electrode(s) may be composed of multiple layers on the same substrate, or on different substrates. In one embodiment, a first grid electrode may be formed on a first substrate (or a first side of a substrate) and a second grid electrode may be formed on a second substrate (or a second side of a substrate). For example, a first grid electrode comprises one or more common electrodes disposed on a thin-film transistor (TFT) layer of the display device 160 (FIG. 1) and a second grid electrode is disposed on the color filter glass of the display device 160. The dimensions of the first and second grid electrodes can be equal or differ in at least one dimension.

In a second mode of operation, the sensor electrodes 120 ($120_{1,1}$, $120_{2,1}$, $120_{3,1}$, ..., $120_{X,Y}$) may be utilized to detect the presence of an input object via transcapacitive sensing techniques when a transmitter signal is driven onto the grid electrode(s). That is, processing system 110 is configured to drive the grid electrode(s) with a transmitter signal and to receive resulting signals with each sensor electrode 120, where a resulting signal comprising effects corresponding to the transmitter signal, which is utilized by the processing system 110 or other processor to determine the position of the input object.

In a third mode of operation, the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitive sensing of capacitive couplings may be termed "capacitive pixels," "touch pixels," "tixels," etc. Capacitive pixels may be formed between an individual sensor electrode 120 and a reference voltage in the first mode of operation, between the sensor electrodes 120 and grid electrode(s) in the second mode of operation, and between groups of sensor electrodes 120 used as transmitter and receiver electrodes (e.g., arrangement 200 of FIG. 2). The capacitive coupling changes with the proximity and motion of input objects in the sensing region 170 associated with the sensor electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or such that multiple transmitter electrodes transmit at the same time. Where multiple transmitter electrodes transmit simultaneously, the multiple transmitter electrodes may transmit the same transmitter signal and thereby produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined. In one embodiment, multiple transmitter electrodes may simultaneously transmit the same transmitter signal while the receiver electrodes receive the effects and are measured according to a scanning scheme.

The sensor electrodes 120 configured as receiver sensor electrodes may be operated singly or multiply to acquire resulting signals. The resulting signals may be used to determine measurements of the capacitive couplings at the capacitive pixels. Processing system 110 may be configured to receive with the sensor electrodes 120 in a scanning fashion and/or a multiplexed fashion to reduce the number of simultaneous measurements to be made, as well as the size of the supporting electrical structures. In one embodiment, one or more sensor electrodes are coupled to a receiver of processing system 110 via a switching element such as a multiplexer or the like. In such an embodiment, the switching element may be internal to processing system 110 or external to processing system 110. In one or more embodiments, the switching elements may be further configured to couple a sensor electrode 120 with a transmitter or other signal and/or voltage potential. In one embodiment, the switching element may be configured to couple more than one receiver electrode to a common receiver at the same time.

In other embodiments, "scanning" sensor electrodes 120 to determine these capacitive couplings comprises modulating one or more of the sensor electrodes and measuring an absolute capacitance of the one or sensor electrodes. In another embodiment, the sensor electrodes may be operated such that more than one sensor electrode is driven and received with at a time. In such embodiments, an absolute capacitive measurement may be obtained from each of the one or more sensor electrodes 120 simultaneously. In one embodiment, each of the sensor electrodes 120 are simultaneously driven and received with, obtaining an absolute capacitive measurement simultaneously from each of the sensor electrodes 120. In various embodiments, processing system 110 may be configured to selectively modulate a portion of sensor electrodes 120. For example, the sensor electrodes may be selected based on, but not limited to, an application running on the host processor, a status of the input device, and an operating mode of the sensing device. In various embodiments, processing system 110 may be configured to selectively shield at least a portion of sensor electrodes 120 and to selectively shield or transmit with the grid electrode(s) 122 while selectively receiving and/or transmitting with other sensor electrodes 120.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In any of the above embodiments, multiple sensor electrodes 120 may be ganged together such that the sensor electrodes 120 are simultaneously modulated or simultaneously received with. As compared to the methods described above, ganging together multiple sensor electrodes may produce a coarse capacitive image that may not be usable to discern precise positional information. However, a coarse capacitive image may be used to sense presence of an input object. In one embodiment, the coarse capacitive image may be used to move processing system 110 or the input device 100 out of a "doze" mode or low-power mode. In one embodiment, the coarse capacitive image may be used to move a capacitive sensing IC out of a "doze" mode or low-power mode. In another embodiment, the coarse capacitive image may be used to move at least one of a host IC and a display driver out of a "doze" mode or low-power mode. The coarse capacitive image may correspond to the entire sensor area or only to a portion of the sensor area.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances. The background capacitance or the baseline capacitance may be present due to stray capacitive coupling between two sensor electrodes, where one sensor electrode is driven with a modulated signal and the other is held stationary relative to system ground, or due to stray capacitive coupling between a receiver electrode and nearby modulated electrodes. In many embodiments, the background or baseline capacitance may be relatively stationary over the time period of a user input gesture.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. The display electrodes may comprise one or more elements of the active matrix display such as one or more segments of a segmented Vcom electrode (common electrode(s)), a source drive line, gate line, an anode sub-pixel electrode or cathode pixel electrode, or any other suitable display element. These display electrodes may be disposed on an appropriate display screen substrate. For example, the common electrodes may be disposed on the a transparent substrate (a glass substrate, TFT glass, or any other transparent material) in some display screens (e.g., In-Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the display electrode can also be referred to as a "combination electrode," since it performs multiple functions. In various embodiments, each of the sensor electrodes 120 comprises one or more common electrodes. In other embodiments, at least two sensor electrodes 120 may share at least one common electrode. While the following description may describe that sensor electrodes 120 and/or grid electrode(s) comprise one or more common electrodes, various other display electrodes as describe above may also be used in conjunction with the common electrode or as an alternative to the common electrodes. In various embodiments, the sensor electrodes 120 and grid electrode(s) comprise the entire common electrode layer (Vcom electrode).

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer multiple of the display frame rate. In one or more embodiments, the display frame rate may change (e.g., to reduce power or to provide additional image data such as a 3D display information) while touch frame rate maintains constant. In other embodiment, the display frame rate may remain constant while the touch frame rate is increased or decreased.

Continuing to refer to FIG. 3, the processing system 110 coupled to the sensor electrodes 120 includes a sensor module 310 and optionally, a display driver module 320. The sensor module 310 includes circuitry configured to drive at least one of the sensor electrodes 120 for capacitive sensing during periods in which input sensing is desired. In one embodiment, the sensor module 310 is configured to drive a modulated signal onto the at least one sensor electrode 120 to detect changes in absolute capacitance between the at least one sensor electrode and an input object. In another embodiment, the sensor module 310 is configured to drive a transmitter signal onto the at least one sensor electrode 120 to detect changes in a transcapacitance between the at least one sensor electrode and another sensor electrode 120. The modulated and transmitter signals are generally varying voltage signals comprising a plurality of voltage transitions over a period of time allocated for input sensing. In various embodiments, the sensor electrodes 120 and/or grid electrode(s) may be driven differently in different modes of operation. In one embodiment, the sensor electrodes 120 and/or grid electrode(s) may be driven with signals (modulated signals, transmitter signals and/or shield signals) that may differ in any one of phase, amplitude, and/or shape. In various embodiments, the modulated signal and transmitter signal are similar in at least one shape, frequency, amplitude, and/or phase. In other embodiments, the modulated signal and the transmitter signals are different in frequency, shape, phase, amplitude, and phase. The sensor module 310 may be selectively coupled one or more of the sensor electrodes 120 and/or the grid electrode(s). For example, the sensor module 310 may be coupled selected portions of the sensor electrodes 120 and operate in either an absolute or transcapacitive sensing mode. In another example, the sensor module 310 may be a different portion of the sensor electrodes 120 and operate in either an absolute or transcapacitive sensing mode. In yet another example, the sensor module 310 may be coupled to all the sensor electrodes 120 and operate in either an absolute or transcapacitive sensing mode.

The sensor module 310 is configured to operate the grid electrode(s) as a shield electrode that may shield sensor electrodes 120 from the electrical effects of nearby conductors. In one embodiment, the processing system is configured to operate the grid electrode(s) as a shield electrode that may "shield" sensor electrodes 120 from the electrical effects of nearby conductors, and to guard the sensor electrodes 120 from grid electrode(s), at least partially reducing the parasitic capacitance between the grid electrode(s) and the sensor electrodes 120. In one embodiment, a shielding signal is driven onto the grid electrode(s). The shielding signal may be a ground signal, such as the system ground or other ground, or any other constant voltage (i.e., non-modulated) signal. In another embodiment, operating the grid electrode(s) as a shield electrode may comprise electrically floating the grid electrode. In one embodiment, grid electrode(s) are able to operate as an effective shield electrode while being electrode floated due to its large coupling to the other sensor electrodes. In other embodiment, the shielding signal may be referred to as a "guarding signal" where the guarding signal is a varying voltage signal having at least one of a similar phase, frequency, and amplitude as the modulated signal driven on to the sensor electrodes. In one or more embodiment, routing traces may be shielded from responding to an input object due to routing beneath the grid electrode(s) and/or sensor electrodes 120, and therefore may not be part of the active sensor electrodes, shown as sensor electrodes 120.

In one or more embodiments, capacitive sensing (or input sensing) and display updating may occur during at least partially overlapping periods. For example, as a common electrode is driven for display updating, the common electrode may also be driven for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiments, the non-display update period may be referred to as a "long horizontal blanking period," "long h-blanking period" or a "distributed blanking period," where the blanking period occurs between two display updating periods and is at least as long as a display update period. In one embodiment, the non-display update period occurs between display line update periods of a frame and is long enough to allow for multiple transitions of the transmitter signal to be driven onto the sensor electrodes 120. In other embodiments, the non-display update period may comprise horizontal blanking periods and vertical blanking periods. Processing system 110 may be configured to drive sensor electrodes 120 for capacitive sensing during any one or more of or any combination of the different non-display update times. Synchronization signals may be shared between sensor module 310 and display module 320 to provide accurate control of overlapping display updating and capacitive sensing periods with repeatably coherent frequencies and phases. In one embodiment, these synchronization signals may be configured to allow the relatively stable voltages at the beginning and end of the input sensing period to coincide with display update periods with relatively stable voltages (e.g., near the end of a input integrator reset time and near the end of a display charge share time). A modulation frequency of a modulated or transmitter signal may be at a harmonic of the display line update rate, where the phase is determined to provide a nearly constant charge coupling from the display elements to the receiver electrode, allowing this coupling to be part of the baseline image.

The sensor module 310 includes circuitry configured to receive resulting signals with the sensor electrodes 120 and/or grid electrode(s) comprising effects corresponding to the modulated signals or the transmitter signals during periods in which input sensing is desired. The sensor module 310 may determine a position of the input object in the sensing region 170 or may provide a signal including information indicative of the resulting signal to another module or processor, for example, a determination module or a processor of an associated electronic device 150 (i.e., a host processor), for determining the position of the input object in the sensing region 170.

The display driver module 320 may be included in or separate from the processing system 110. The display driver module 320 includes circuitry configured to provide display image update information to the display of the display device 160 during non-sensing (e.g., display updating) periods.

In one embodiment, the processing system 110 comprises a first integrated controller comprising the display driver module 320 and at least a portion of the sensor module 310 (i.e., transmitter module and/or receiver module). In another embodiment, the processing system 110 comprises a first integrated controller comprising the display driver module 320 and a second integrated controller comprising the sensor module 310. In yet another embodiment, the processing system comprises a first integrated controller comprising display driver module 320 and a first portion of the sensor module 310 (e.g., one of a transmitter module and a receiver module) and a second integrated controller comprising a second portion of the sensor module 310 (e.g., the other one of the transmitter and receiver modules). In those embodiments comprising multiple integrated circuits, a synchronization mechanism may be coupled between them, configured to synchronize display updating periods, sensing periods, transmitter signals, display update signals, and the like.

Display Update with Multiple Blanking Periods Per Display Frame

Performing capacitive sensing within the timing used for updating a particular display frame (e.g., capacitive sensing during a long horizontal blanking period) can require pausing a partially-completed display update cycle of the processing system. For certain display implementations, an interruption to the display update cycle can cause display artifacts or other undesirable display performance. For example, LCD panels using relatively slow-switching transistors such as amorphous silicon (a-Si) transistors generally require a period of time after the selection of a particular gate line to increase the voltage of the gate line to a sufficient level to receive pixel data from source lines. Interrupting the display update cycle to perform capacitive sensing can affect the charging time for the gate lines, which can result in display artifacts or degraded display performance.

According to various embodiments described herein, capacitive sensing performance may be improved using a processing system having multiple, independent gate driver circuits configured to update respective display regions within each display frame. Each of the multiple gate driver circuits can begin and complete the display update routine for its respective display region(s) without interruption, and capacitive sensing may be performed during non-display update periods between display updates for different gate driver circuits.

In one embodiment, each one of the gate driver circuits begins driving a gate line near a top of the display and sequentially scans through the gate lines of the respective display region toward a bottom of the display. In one embodiment, the update time associated with driving each gate line may be evenly spatially allocated from the top to the bottom of the display.

Figure 4A:
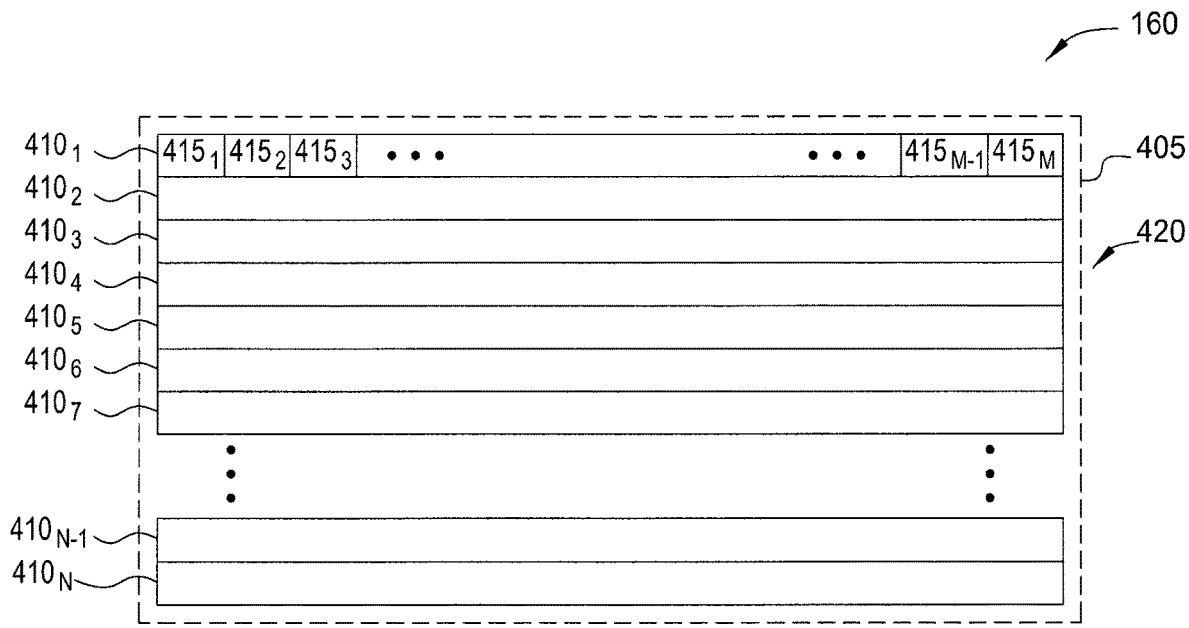
FIGS. 4A and 4B illustrate an exemplary display device, according to embodiments described herein.
Figure 4B:
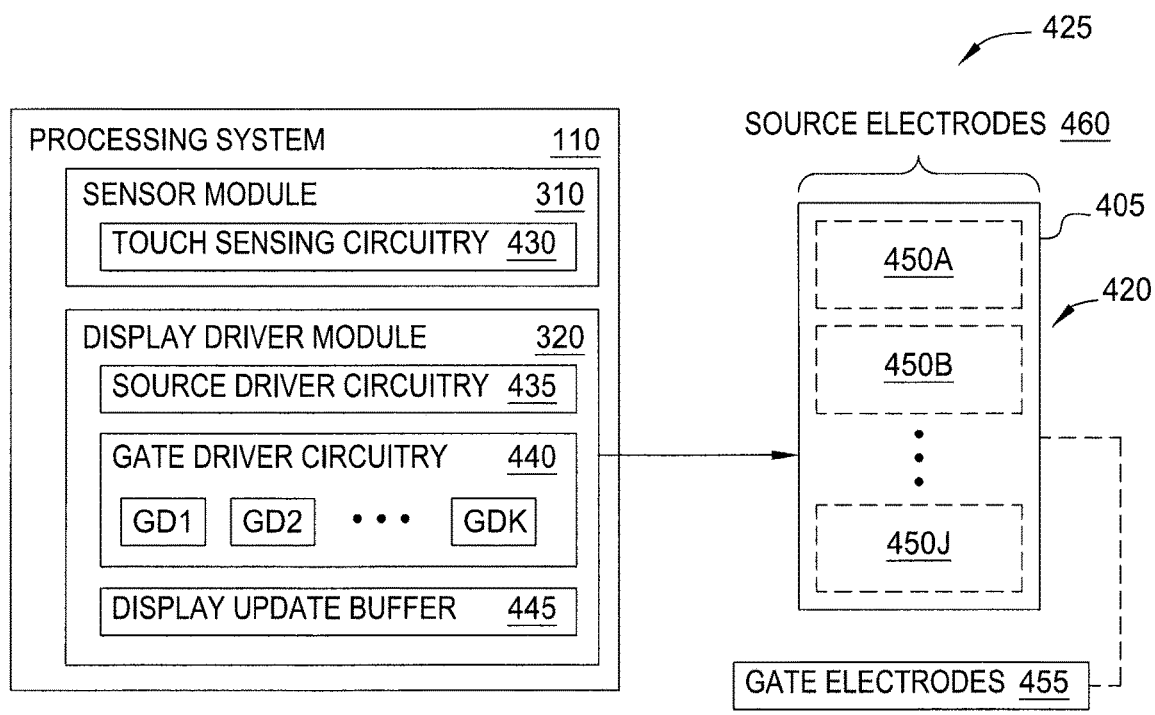

FIGS. 4A and 4B illustrate an exemplary display device, according to embodiments described herein. More specifically, FIG. 4A depicts one implementation of a display device 160, and FIG. 4B illustrates an arrangement 425 including the display device 160 connected with processing system 110.

The display device 160 includes a display area 405 arranged as a plurality of N display lines 410 (i.e., display lines 410$_1$-410$_N$). Each display line 410 comprises a plurality of M pixels 415 (i.e., pixels 415$_1$-415$_M$). In turn, each pixel 415 can include a plurality of subpixels (not shown), such as red, green, and blue (RGB) subpixels, although pixels 415 using alternate color models are possible. Each pixel 415 and/or subpixel corresponds to one or more transistors having terminals connected with portions of the display driver module 320. For example, a transistor at a particular pixel 415 may have a gate terminal coupled with gate driver circuitry 440, and a source terminal coupled with source driver circuitry 435. While shown as a relatively simple, aligned pattern of display lines 410, other arrangements within the display area 405 are also possible. Each complete update of the display area 405—in which all display lines 410 and pixels 415 have been driven with updated display information—corresponds to a particular display frame 420. As discussed above, the display device 160 can be updated at a predetermined display frame rate.

In arrangement 425, the processing system 110 is configured to perform display updating of the display area 405 using display driver module 320. Source driver circuitry 435 is coupled with source electrodes 460 and configured to control voltages driven onto pixels 415 and/or subpixel transistors using the source electrodes 460. The driven voltages on the source electrodes 460 are based on the display data to be updated. Gate driver circuitry 440 is coupled with gate electrodes 455 and configured to control the sequence of display updating by selecting which display lines 410 of the display area 405 are updated at a particular time. In some embodiments, the gate electrodes 455 correspond to display lines 410 in a 1:1 ratio. As shown in arrangement 425, the source electrodes 460 may be arranged along a first dimension while the gate electrodes 455 are arranged along a second, orthogonal direction. Other arrangements of the source electrodes 460 and gate electrodes 455 are possible.

The display update buffer 445 is a memory element configured to store display update information to be used by the gate driver circuitry 440 to update display lines 410. The display update buffer 445 may have any suitable size, such as storing data corresponding one or more display frames 420 or a portion of a frame 420 (e.g., one or more display lines 410 or one or more pixels 415). In some embodiments, the display update buffer 445 is updated during non-display update periods, and which in some cases can be performed contemporaneously with performing capacitive sensing measurements.

Gate driver circuitry 440 includes a plurality of K gate driver circuits GD-1, GD-2, . . . , GD-K each of which includes logic having functionality for driving gate electrodes 455 of the display device 160 to update the display. The number K of separate gate driver circuits included in gate driver circuitry 440 could be limited by other design considerations for the display device 160. For example, in some cases the area occupied by the gate driver circuits GD-1, GD-2, . . . , GD-K and the corresponding electrical routing to connect with gate electrodes 455 is substantial enough that K may be limited to two gate driver circuits. In other embodiments, more than two gate driver circuits may be included. Although not shown, in some embodiments multiplexing or other switching techniques may be used to selectively connect gate electrodes 455 with different gate driver circuits GD-1, GD-2, . . . , GD-K.

In one embodiment, each gate driver circuit GD-1, GD-2, . . . , GD-K represents a discrete IC of the display driver module 320. In another embodiment, two or more gate driver circuits GD-1, GD-2, . . . , GD-K are included on a same IC. In some implementations, the gate driver circuits GD-1, GD-2, . . . , GD-K are disposed along one or more edges of the display device 160. The arrangement of the gate driver circuits GD-1, GD-2, . . . , GD-K may be substantially parallel to the source electrodes 460, as the gate electrodes 455 connected with the gate driver circuits GD-1, GD-2, . . . , GD-K are often disposed perpendicular to the source electrodes 460. The gate driver circuits GD-1, GD-2, . . . , GD-K are collectively used to drive gate electrodes 455 associated with the display lines 410 and/or pixels 415 in order to permit the source driver circuitry 435 (through source electrodes 460) to update pixel voltages using display data. The display lines 410 and/or pixels 415 of the display area 405 are grouped into a plurality of display regions 450 (i.e., 450A-450J). In one embodiment, during each display frame 420, each gate driver circuit GD-1, GD-2, . . . , GD-K is used to update a respective one or more display regions 450 of the display area 405. In one example, the number of gate driver circuits (i.e., K) is the same as the number of display regions 450, and each gate driver circuit GD-1, GD-2, . . . , GD-K corresponds to a display region 450 in a 1:1 ratio. In another example, at least one of gate driver circuits GD-1, GD-2, . . . , GD-K corresponds to a plurality of display regions 450. In some cases, a gate driver circuit that is coupled with a plurality of display regions 450 may be connected with switching elements, multiplexers, etc. to gate electrodes 455 of the different display regions. When updating a first display region 450 during a first period, the gate driver circuit is coupled with gate electrodes 455 of the first display region 450. The switching elements, multiplexers, etc. are controlled by the display driver module 320 to couple the gate driver circuit with different gate electrodes 455 corresponding to a second display region 450 in order to update the second display region 450 during a second period.

The display regions 450 of display area 405 can be non-overlapping, and collectively include all of the display lines 410 and/or pixels 415 within display area 405. While display regions 450 are depicted as rectangles of equal size—e.g., an equal number of contiguous display lines 410 included within each display region 450—other embodiments can include display regions 450 having different sizes and/or shapes within the display area 405. In some cases, a display region 450 corresponding to a particular gate driver circuit GD-1, GD-2, . . . , GD-K may include non-contiguous display lines 410 and/or non-contiguous pixels 415. In one embodiment, the display area 405 may include display lines 410 that are interleaved between the different display regions 450A-450J. In one exemplary implementation of interleaving using two display regions 450, a first region 450A corresponds to all even-numbered display lines 410 within the display area 405, while a second region 450B corresponds to all odd-numbered display lines 410. Other interleaving or alternative non-contiguous arrangements are also possible.

Figure 5A:
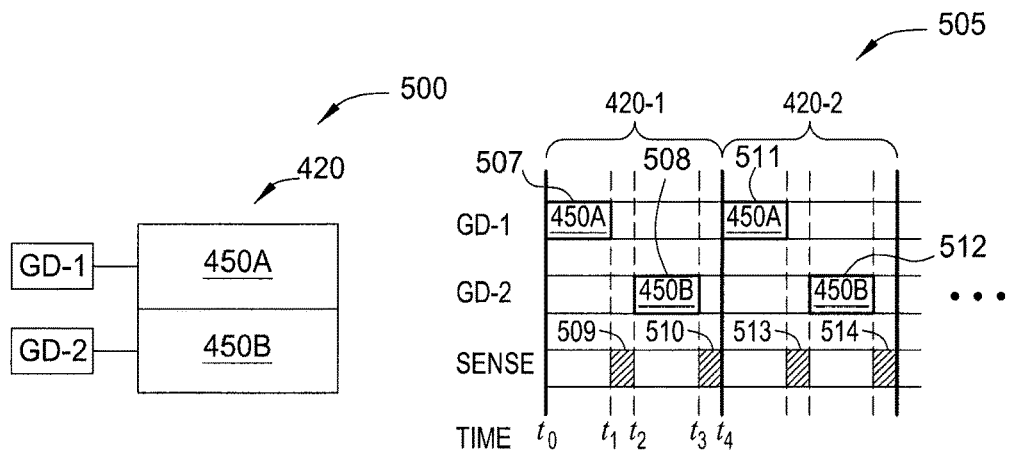
FIGS. 5A-5C illustrate exemplary patterns and timing of display updating and capacitive sensing, according to embodiments described herein.
Figure 5B:
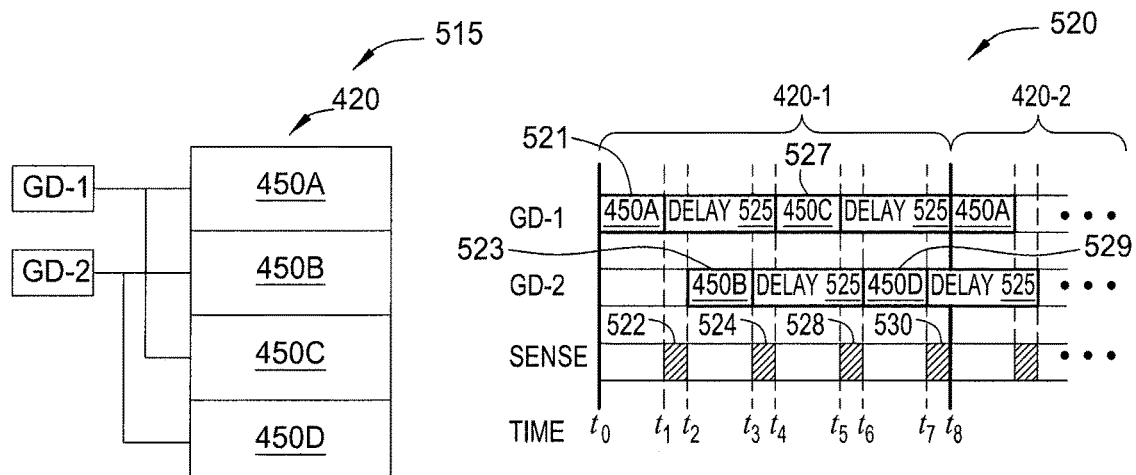
Figure 5C:
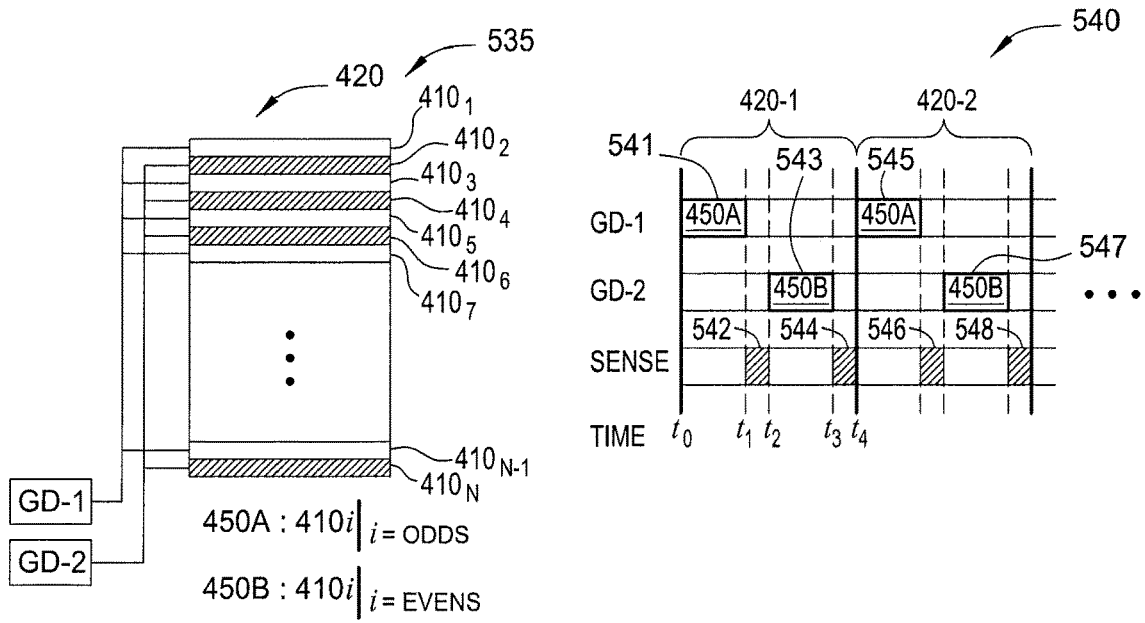

FIGS. 5A-5C illustrate exemplary patterns and timing of display updating and capacitive sensing, according to embodiments described herein. In arrangement 500, a display frame 420 is illustrated in which first gate driver circuitry (GD-1) is configured to update a first display region 450A during each display frame 420, and second gate driver circuitry (GD-2) is configured to update a second display region 450B. While each display region 450 is shown as approximately half of the display frame 420, the proportions of first and second display regions 450A, 450B may vary. Additionally, as discussed above, the first and second display regions 450A, 450B can include non-contiguous display lines and/or pixels. Further, although two gate driver circuits GD-1, GD-2 are depicted in FIGS. 5A-5C, alternative implementations may include three or more gate driver circuits using similar techniques.

Diagram 505 illustrates the timing for operating GD-1, GD-2, and touch sensing circuitry 430 ("SENSE") corresponding to arrangement 500. At time $t_0$, display updating begins for a first display frame 420-1. The display updating period may be initiated by a host processor or other processor coupled with GD-1 and GD-2. The first gate driver circuitry GD-1 updates display region 450A between times $t_0$ and $t_1$, corresponding to a first period 507. The first gate driver circuitry GD-1 may receive display update data in sequence from the controlling processor in real-time (e.g., using a serial interface), or the display update data may be read from the display update buffer. The first gate driver circuitry GD-1 can update display lines and/or pixels in any suitable fashion, whether in a sequential order or in another predetermined order. Similarly, second gate driver circuitry GD-2 updates display region 450B between times $t_2$ and $t_3$, which corresponds to a second period 508.

At time $t_1$, GD-1 has completed the display update for display region 450A. During a third period 509 between times $t_1$ and $t_2$ in which display updating is not performed, capacitive sensing can be performed by the touch sensing circuitry 430 (SENSE) for a portion or all of the third period 509. The length of time used for capacitive sensing can be selected based on the desired performance of the capacitive sensing and/or display updating. In many cases, allotting more time for performing capacitive sensing or display updating can provide greater performance. Other processing functions may also be performed during the third period 509, such as updating the display update buffer with display data for the next period of display updating (e.g., buffering for updating the display region 450B). In one embodiment, the third period 509 is at least as long as a display line update period.

After the display update for display region 450B is complete at time $t_3$, another non-display updating period may be included within the display frame 420 as fourth period 510. In one embodiment, the fourth period 510 is at least as long as a display line update period. In some embodiments, the lengths of the non-display update periods (third period 509 and fourth period 510) are the same. In other embodiments, the length of the non-display update periods can differ within a period for updating a display frame and/or across periods for updating multiple display frames. For example, the processing system may attempt to improve sensing performance at a particular time (e.g., due to noise), and increase the length of non-display update periods included in subsequent display frames 420. Likewise, the length of non-display update periods may be decreased if improved sensing performance is not needed, if better display performance is desired, etc. During the fourth period 510, capacitive sensing may be performed and/or updating the display update buffer with display data corresponding to the next display region 450 to be updated (here, display region 450A within the next display frame 420-2). The gate driver circuitry GD-1 and GD-2, and touch sensing circuitry (SENSE) may operate with similar timing (periods 511, 512, 513, 514) for subsequent display frames such as 420-2.

In one embodiment, the entire sensing region 170 of the input device 100 (not shown) is scanned a first time during the third period 509, and a second time during the fourth period 510. In such an embodiment, the sensing frame rate is twice (2×) the display frame rate. In other embodiments, the sensing frame rate may vary. In one example, the entire sensing region 170 could be scanned during third period 509, and no capacitive sensing is performed in the fourth period 510 (here, the sensing frame rate and display frame rate are equal). In another example, a first portion of the sensing region 170 is scanned during the third period 509, and a second portion of the sensing region 170 is scanned during the fourth period 510. Depending on the size of the scanned portions, the sensing frame rate may be greater than, equal to, or less than the display frame rate.

As discussed above, in some implementations of display devices, interrupting a gate driver circuit such as GD-1 during its sequence of display updating (e.g., temporarily "pausing" the display update by GD-1 to perform touch sensing, such as during a long horizontal blanking period) can alter the timing and/or charge state of pixel gate lines associated with GD-1, which in turn affects the voltage that can be driven onto the pixel by source driver circuitry 435. The affected voltage can result in an incorrect display for the particular display data, such as altered color levels or visible artifacts on the display device.

By including a plurality of independent gate driver circuits GD-1, GD-2, GD-K that are each responsible for updating certain portion(s) of the display area during a display frame 420, multiple periods of touch sensing can be included within an update period for the display frame 420 without the risk of altering the charge state of pixel gate lines. In one embodiment, each gate driver circuit GD-1, GD-2, . . . , GD-K can complete an update of its corresponding display region(s) uninterrupted, and the touch sensing periods may be inserted between display updates from different gate driver circuits (e.g., after one gate driver circuit completes, before the next one begins). Additionally, the use of multiple gate driver circuits GD-1, GD-2, . . . , GD-K for updating specific portions of display frames 420 in most cases does not require significant adaptation of the control signals sent to the gate driver circuits. For example, each gate driver circuit GD-1, GD-2, . . . , GD-K can be instructed to begin display updating for the corresponding display region(s), and the gate driver circuit may perform its display updating routine without significant external interruption.

While the timing and patterns of display updating and capacitive sensing were described with respect to operation of two gate driver circuits GD-1, GD-2, the person of ordinary skill in the art will be capable of applying these techniques to implementations having greater numbers of gate driver circuits.

In some embodiments, a particular gate driver circuit may correspond to two or more display regions 450 of a display area that are updated within a display frame 420. The gate driver circuit may be configured to, during a display update period, complete its entire update sequence of the two or more display regions without the sequence being interrupted by a host processor etc. to perform capacitive sensing. In this way, the charge of pixel gate lines will not altered, reducing the possibility of incorrect display of the display data. In some cases, the gate driver circuits GD-1, GD-2, . . . , GD-K may incorporate one or more predetermined delays within its update sequence to avoid an external interruption to the display update.

Arrangement 515 illustrates one embodiment in which gate driver circuits update two or more display regions 450. In arrangement 515, a display frame 420 is illustrated in which first gate driver circuitry (GD-1) is configured to update a first display region 450A and third display region 450C of each display frame 420, and second gate driver circuitry (GD-2) is configured to update a second display region 450B and fourth display region 450D of each display frame 420. While each display region 450 is shown as an approximately equal portion of the display frame 420, the proportions of the display regions 450A-D may vary and in some cases may include non-contiguous display lines and/or pixels.

Diagram 520 illustrates the timing for operating GD-1, GD-2, and touch sensing circuitry 430 ("SENSE") corresponding to the arrangement 515. At time $t_0$, display updating begins for a first display frame 420-1. The display updating period may be initiated by a host processor or other processor coupled with GD-1 and GD-2.

The first gate driver circuitry GD-1 updates display region 450A between times $t_0$ and $t_1$ (a first period 521). The second gate driver circuitry GD-2 updates display region 450B between times $t_2$ and $t_3$, (a second period 523). Third period 522 and fourth period 524 are non-display update periods and may be used to perform capacitive sensing, updating the display buffer, etc. In a similar manner, the first gate driver circuitry GD-1 updates display region 450C between times $t_4$ and $t_5$ (a fifth period 527). The second gate driver circuitry GD-2 updates display region 450D between times $t_6$ and $t_7$, (a sixth period 529). Seventh period 528 and eighth period 530 are non-display update periods and may be used to perform capacitive sensing, updating the display buffer, etc.

As discussed above, interrupting the display updating cycle of the first and second gate driver circuitry GD-1, GD-2 to perform periods of capacitive sensing within the non-display update periods 522, 524, 528, 530 can affect display performance. Therefore, in some embodiments, the processing system may include one or more predetermined delay periods 525 between different periods of display updating for a particular gate driver circuit GD-1, GD-2 within a display frame 420. In this way, the display update cycle of the gate driver circuitry GD-1 and GD-2 is not externally interrupted (i.e., leading to an altered charge state on certain gate lines and affecting display performance), but each predetermined delay period 525 allows the processing system to maintain and/or restore the various gate line charge states prior to the next period of display updating.

As shown, gate driver circuit GD-1 has predetermined delays 525 between times $t_1$ and $t_4$, and between times $t_5$ and $t_8$. Similarly, gate driver circuit GD-2 has predetermined delays 525 between times $t_3$ and $t_6$, and from time $t_7$ until the next display updating period (within the next display frame 420-2). The predetermined delays 525 may all have the same length or may have differing lengths. Furthermore, in some embodiments the predetermined delays 525 are not included for periods after the gate driver circuit GD-1, GD-2 has completed its respective display update cycle for a particular display frame 420. For gate driver circuit GD-1 and display frame 420-1, this corresponds to times $t_5$-$t_8$, and for gate driver circuit GD-2, times $t_7$-$t_8$. The gate driver circuits GD-1, GD-2 may be returned to an idle state or other power-conserving state during these times. Similarly, between times $t_0$ and $t_1$ the gate driver circuit GD-2 may be operated in an idle state because it has not yet begun performing display updating for display frame 420-1.

Arrangement 535 illustrates one embodiment in which the display lines 410 of display regions 450A, 450B are interleaved. More specifically, first gate driver circuitry GD-1 is configured to update the display region 450A comprising the odd-indexed display lines $410_1$, $410_3$, . . . , $410_{N-1}$, while second gate driver circuitry GD-2 is configured to update the display region 450B comprising the even-indexed display lines $410_2$, $410_4$, . . . , $410_N$ (shaded). In alternate implementations, the display regions 450 may include interleaved display lines 410 that are spaced further apart, such as every third display line 410, every fourth display line 410, etc. For example, if three gate driver circuits are used, a first display region 450 may correspond to display lines $410_1$, $410_4$, $410_7$, . . . , a second display region 450 may correspond to display lines $410_2$, $410_5$, $410_8$, . . . , and a third display region 450 may correspond to display lines $410_3$, $410_6$, $410_9$, . . . .

Diagram 540 illustrates the timing for operating GD-1, GD-2, and touch sensing circuitry 430 ("SENSE") corresponding to the arrangement 535. During first period 541, each of the display lines $410_1$, $410_3$, . . . , $410_{N-1}$ of display region 450A are updated. During second period 543, each of the display lines $410_2$, $410_4$, . . . , $410_N$ of display region 450B are updated. During first period 541 and second period 543, the display lines 410 may be updated sequentially or in any desired order. During a third period 542—a non-display updating period between first period 541 and second period 543—capacitive sensing may be performed by the touch sensing circuitry 430 for a portion or all of the third period 542. Similarly, during a fourth period 544 following second period 543, capacitive sensing may again be performed. The sequence substantially repeats in periods 545, 546, 547, and 548 for a subsequent display frame 420-2.

Although not shown in diagram 540, the interleaved display lines 410 may be further sub-divided from the (interleaved) display regions 450A, 450B into additional distinct display sub-regions for updating at different times. For example, the display region 450A (here, the odd-indexed display lines $410_1$, $410_3$, . . . , $410_{N-1}$) could be further divided in half or any other suitable proportion, such that the gate driver circuit GD-1 updates a first sub-region of the display region 450A at a first time, a second sub-region of the display region 450A at a second time, and so forth. In this case, the timing for display updating may advantageously include one or more predetermined delays 525 for the gate driver circuit GD-1 between different sub-regions of the display region 450A.

In addition to allowing multiple periods of touch sensing within an update period for a display frame 420 without the risk of altering the charge state of pixel gate lines, the interleaved arrangement 535 offers several additional benefits. For example, in some LCD panels, the first display lines that are updated by a gate driver circuit (often the uppermost display lines of the panel) can be dimmer than subsequently updated display lines. Often, the gate electrodes 455 are scanned from top to bottom, such that the display lines 410 located near the top of the display are updated long before the display lines located near the bottom. By interleaving the updating of the display lines, after all the even-numbered display lines are updated, all the odd lines are then updated, which reduces the amount of time between when the top portion of the display is updated and when the bottom portion is updated, thereby improving display performance. Further, by performing updating from the top of the display to the bottom of the display twice or more per display frame, multiple different brightness gradients in the top-bottom direction are created, which when overlapped with each other are nearly invisible to the human eye. Additionally, the use of multiple gate driver circuits can provide an overall simpler implementation, as each gate driver circuit can be implemented as a respective shift register.

The interleaved display regions 450A and/or 450B may be updated with frame inversion and/or line inversion during different display frames. For example, the display lines $410_1$, $410_3$, ..., $410_{N-1}$ of display region 450A may all be driven to positive polarity values during a first display frame 420-1, then driven to negative polarity values during the next display frame 420-2, and so on. If the display lines $410_2$, $410_4$, ..., $410_N$ of display region 450B are driven to positive polarity values during the first display frame 420-1, the combined effect is frame inversion (all display lines alternate between positive values and negative values). If the display lines $410_2$, $410_4$, ..., $410_N$ of display region 450B are driven to negative polarity values during the first display frame 420-1, the combined effect is line inversion. Advantageously, allowing each gate driver circuits GD-1, GD-2 to drive all of its respective display lines with same-polarity values during a particular display frame 420 conserves power, when compared with a gate driver circuit that regularly alternates polarity (e.g., each display line 410) during the update of the display frame 420.

Figure 6:
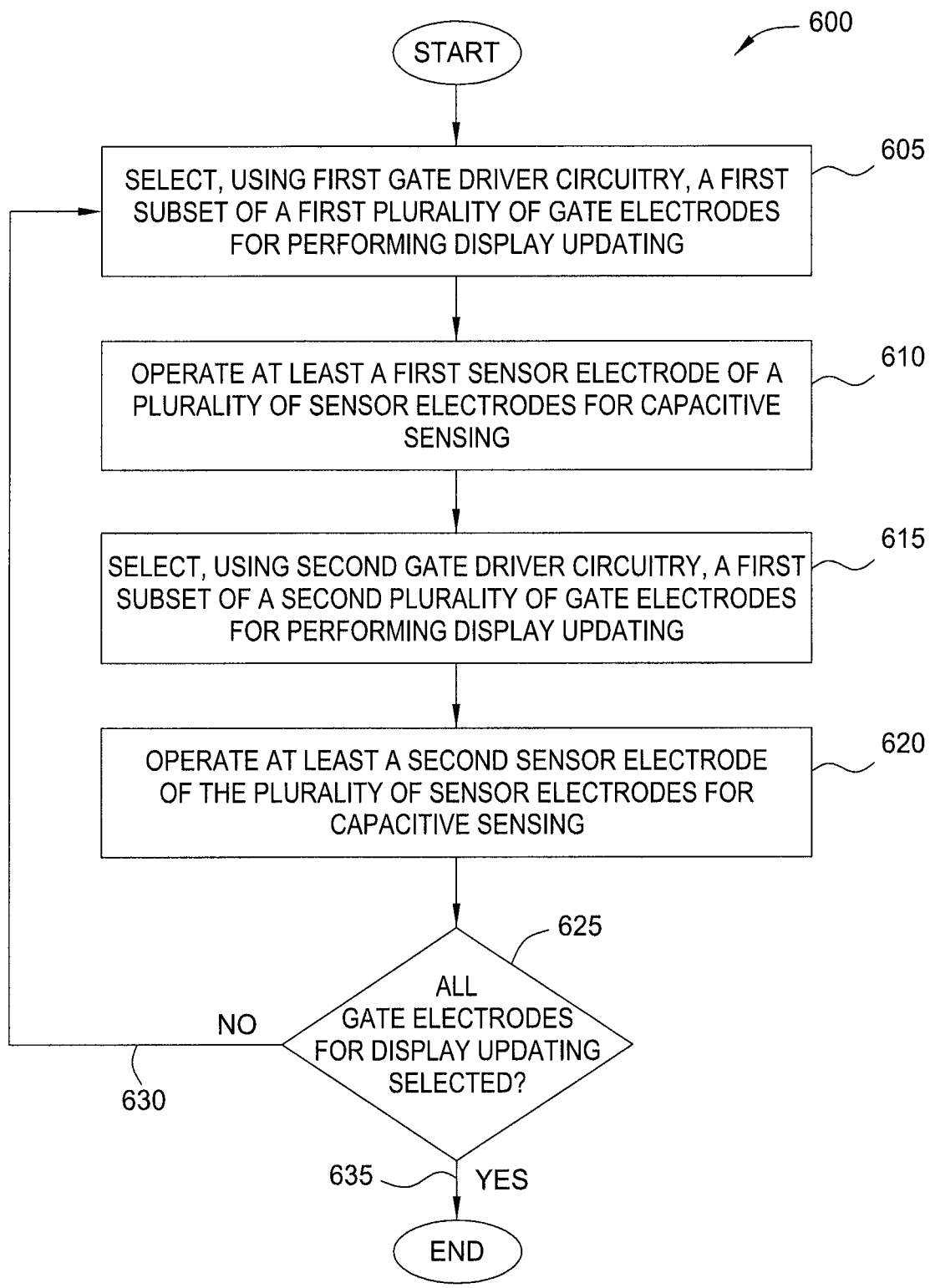
FIG. 6 illustrates a method of operating an input device having a display device with an integrated sensing device, according to embodiments described herein.

FIG. 6 illustrates a method 600 of operating an input device having a display device with an integrated sensing device, according to embodiments described herein. The techniques of method 600 may be performed by a processing system associated with the input device, and may be used consistently with various embodiments of the input device 100 and processing system 110 described herein.

Method 600 begins at block 605, where the processing system selects, using first gate driver circuitry, a first subset of a first plurality of gate electrodes for performing display updating. The first subset of the first plurality of gate electrodes generally corresponds to a predetermined display region, which may include a set of contiguous display lines, interleaved display lines, etc. At block 610, the processing system operates at least a first sensor electrode of a plurality of sensor electrodes for capacitive sensing. In some embodiments, block 610 occurs within a non-display updating period and may be at least as long as a display line update period. The plurality of sensor electrodes may each include at least one display electrode that is configured both for display updating and capacitive sensing (e.g., a common electrode of the display electrodes).

At block 615 the processing system selects, using second gate driver circuitry, a first subset of a second plurality of gate electrodes for performing display updating. The first subset of the second plurality of gate electrodes generally corresponds to another predetermined display region. In some embodiments, the first and second gate driver circuitries are disposed in separate ICs of the processing system. At block 620, the processing system operates at least a second sensor electrode of a plurality of sensor electrodes for capacitive sensing. In some embodiments, block 620 occurs within a non-display updating period and may be at least as long as a display line update period. At block 625, the processing system determines whether all of the plurality of gate electrodes have been selected for display updating. If all of the plurality of gate electrodes have been selected (YES), the method proceeds along branch 635 and ends. If not (NO) the method returns to block 605 using branch 630, where the first and second gate driver circuitry may select additional subsets of the respective first and second pluralities of gate electrodes for display updating. The first and second gate driver circuitry may include one or more predetermined delays between selecting the first subset and a second subset (and any subsequent subsets) of the plurality of gate electrodes. In this way, the first and second gate driver circuitry may start and complete the update of the corresponding display region uninterrupted, while allowing two or more periods for capacitive sensing to occur within the timing for updating a particular display frame. The method may continue returning from block 625 to block 605 until the entire display frame has been updated, and then end.

Thus, the embodiments and examples set forth herein were presented in order to best explain the embodiments in accordance with the present technology and its particular application and to thereby enable those skilled in the art to make and use the disclosure. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

What is claimed is:

1. An input device having a display device with an integrated sensing device, the input device comprising:
   a plurality of sensor electrodes;
   first and second discrete gate driver circuitry coupled to a plurality of gate electrodes of the display device; and
   a processing system coupled with the plurality of sensor electrodes and configured to:
      select, using the first discrete gate driver circuitry, each gate electrode coupled to the first discrete gate driver circuitry to begin and complete display updating during a first period without interruption of the first discrete gate driver circuitry by capacitive sensing,
      select, using the second discrete gate driver circuitry, each gate electrode coupled to the second discrete gate driver circuitry to begin and complete display updating during a second period without interruption of the second discrete gate driver circuitry by capacitive sensing, wherein a first gate electrode coupled to the first discrete gate driver circuitry is interleaved between a first and second gate electrode coupled to the second discrete gate driver circuitry, and operate, during a third period between the first and second periods, at least a first sensor electrode of the plurality of sensor electrodes for capacitive sensing.

2. The input device of claim 1, wherein the first sensor electrode is operated for absolute capacitive sensing.

3. The input device of claim 1, wherein each of the plurality of sensor electrodes comprises at least one display electrode of a plurality of display electrodes of the display device, the plurality of display electrodes configured to perform capacitive sensing and display updating.

4. The input device of claim 1, wherein the plurality of sensor electrodes comprises at least one receiver electrode, wherein the processing system is configured to drive the first sensor electrode with a capacitive sensing signal and receive resulting signals with the receiver electrode, the resulting signals comprising effects corresponding to the driven capacitive sensing signal.

5. The input device of claim 1, wherein the third period is at least as long as a display line update period.

6. The input device of claim 1, wherein the processing system is further configured to operate, during a fourth period after the second period, at least a second sensor electrode of the plurality of sensor electrodes for capacitive sensing.

7. The input device of claim 6, wherein the processing system is further configured to select, using the first discrete gate driver circuitry, a second subset of the plurality of gate electrodes for performing display updating during a fifth period after the fourth period.

8. The input device of claim 1, wherein the processing system is further configured to buffer display update information during the third period.

9. A processing system for a display device with an integrated sensing device, the processing system comprising:

first discrete gate driver circuitry configured to select, during a first period, a first subset of a first plurality of gate electrodes of the display device for to begin and complete display updating without interruption of the first discrete gate driver circuitry by capacitive sensing; and second discrete gate driver circuitry configured to select, during a second period, a first subset of a second plurality of gate electrodes of the display device for to begin and complete display updating without interruption of the second discrete gate driver circuitry by capacitive sensing, wherein a first gate electrode of the first plurality of gate electrodes is interleaved between a first and second gate electrode of the second plurality of gate electrodes; and sensing circuitry coupled with a plurality of sensor electrodes and configured to:

operate, during a third period between the first and second periods, at least a first sensor electrode of the plurality of sensor electrodes for capacitive sensing.

10. The processing system of claim 9, wherein the sensing circuitry is configured to operate the first sensor electrode for absolute capacitive sensing.

11. The processing system of claim 9, wherein each of the plurality of sensor electrodes comprises at least one display electrode of a plurality of display electrodes of the display device, the plurality of display electrodes configured to perform capacitive sensing and display updating.

12. The processing system of claim 9, wherein the plurality of sensor electrodes comprises at least one receiver electrode, wherein the sensing circuitry is configured to drive the first sensor electrode with a capacitive sensing signal and receive resulting signals with the receiver electrode, the resulting signals comprising effects corresponding to the driven capacitive sensing signal.

13. The processing system of claim 9, wherein the third period is at least as long as a display line update period.

14. The processing system of claim 9, wherein the sensing circuitry is further configured to operate, during a fourth period after the second period, at least a second sensor electrode of the plurality of sensor electrodes for capacitive sensing.

15. The processing system of claim 14, wherein the first discrete gate driver circuitry is further configured to select, during a fifth period after the fourth period, a second subset of the first plurality of gate electrodes for performing display updating.

16. The processing system of claim 9, further comprising a buffer configured to receive display update information during the third period.

17. A method of operating an input device having a display device with an integrated sensing device, the method comprising:

selecting, using first discrete gate driver circuitry, a first subset of a first plurality of gate electrodes of the display device to begin and complete performing display updating during a first period without interruption of the first discrete gate driver circuitry by capacitive sensing;

selecting, using second discrete gate driver circuitry, a first subset of a second plurality of gate electrodes of the display device to begin and complete display updating during a second period without interruption of the second discrete gate driver circuitry by capacitive sensing, wherein a first gate electrode of the first plurality of gate electrodes is interleaved between a first and second gate electrode of the second plurality of gate electrodes; and operating, during a third period between the first and second periods, at least a first sensor electrode of a plurality of sensor electrodes for capacitive sensing.

18. The method of claim 17, wherein the plurality of sensor electrodes comprises at least one receiver electrode, wherein operating the first sensor electrode comprises:

driving the first sensor electrode with a capacitive sensing signal; and receiving resulting signals with the receiver electrode, the resulting signals comprising effects corresponding to the driven capacitive sensing signal.

19. The method of claim 17, further comprising:

operating, during a fourth period after the second period, at least a second sensor electrode of the plurality of sensor electrodes for capacitive sensing.

20. The method of claim 19, further comprising:

selecting, using the first discrete gate driver circuitry, a second subset of the first plurality of gate electrodes for performing display updating during a fifth period after the fourth period.

21. The method of claim 17, wherein each of the plurality of sensor electrodes comprises at least one display electrode of a plurality of display electrodes of the display device, the plurality of display electrodes configured to perform capacitive sensing and display updating.

* * * * *

UNITED STATES PATENT AND TRADEMARK OFFICE
CERTIFICATE OF CORRECTION

PATENT NO. : 10,592,022 B2
APPLICATION NO. : 14/983230
DATED : March 17, 2020
INVENTOR(S) : Petr Shepelev and Jeffrey A. Small Page 1 of 1

It is certified that error appears in the above-identified patent and that said Letters Patent is hereby corrected as shown below:

In the Claims

Claim 9, Column 23, Line 41, after "device" delete "for".

Claim 9, Column 23, Line 47, after "device" delete "for".

Signed and Sealed this
Seventh Day of July, 2020

Andrei Iancu
*Director of the United States Patent and Trademark Office*